United States Patent [19]

Wakamiya

[11] 4,210,851
[45] Jul. 1, 1980

[54] MOTOR CONTROL SYSTEM

[75] Inventor: Tadamitsu Wakamiya, Tokyo, Japan

[73] Assignee: Sony Corporation, Tokyo, Japan

[21] Appl. No.: 935,967

[22] Filed: Aug. 22, 1978

[30] Foreign Application Priority Data

Aug. 25, 1977 [JP] Japan .................................. 52-101123

[51] Int. Cl.$^2$ ............................................. H02P 5/00
[52] U.S. Cl. ..................................... 318/257; 318/295
[58] Field of Search ............... 318/255, 256, 257, 280, 318/287, 291, 293, 294, 295, 305, 309, 310, 311, 312, 319, 326, 327, 328, 329, 339, 341, 345, 346, 348, 349, 740, 756

[56] References Cited

U.S. PATENT DOCUMENTS

| | | | |
|---|---|---|---|
| 2,519,339 | 8/1950 | Avery | 318/257 |
| 2,675,512 | 4/1954 | Ruhland | 318/257 |
| 2,846,632 | 8/1958 | Dudenhausen | 318/294 |
| 3,678,354 | 7/1972 | Kitanosono et al. | 318/294 |
| 3,753,065 | 8/1973 | Chiles | 318/295 |
| 3,950,683 | 4/1976 | Lamson | 318/327 |

Primary Examiner—Gene Z. Rubinson
Assistant Examiner—John W. Redman
Attorney, Agent, or Firm—Lewis H. Eslinger; Alvin Sinderbrand

[57] ABSTRACT

A motor control system for controlling the speed and direction at which a motor operates. A drive circuit is provided for supplying a drive current to the motor, the magnitude of the drive current being determinative of the speed at which the motor operates. A direction-determining circuit determines the direction at which the motor operates and, for example, may comprise a steering circuit for steering the drive current to the motor in first and second current paths. A potentiometer having a resistance connected between first and second terminals and an adjustable wiper which is settable along the resistance is used to determine the desired speed and direction of operation of the motor. The setting of the wiper includes a predetermined zero speed setting which, preferably, is at some intermediate point along the resistance. A power supply having a power terminal and a reference terminal produces an operating potential across these terminals. The power terminal is coupled to the potentiometer wiper and the reference terminal is coupled to one of the potentiometer terminals. A resistor couples the other potentiometer terminal to the power supply reference terminal. The potentiometer wiper is coupled to the drive circuit and the potentiometer terminal which is coupled to the resistor also is coupled to the direction-determining circuit. The setting of the wiper determines the magnitude of the voltage supplied to the drive circuit so as to determine the motor speed, and the setting of the wiper also determines the magnitude of the voltage supplied to the direction-determining circuit by the potentiometer terminal so as to determine the direction at which the motor operates. Advantageously, only a single source of operating potential need be used with the potentiometer to determine motor direction.

12 Claims, 13 Drawing Figures

MOTOR CONTROL SYSTEM

BACKGROUND OF THE INVENTION

This invention relates to a motor control system and, more particularly, to such a system wherein a potentiometer is used to control the speed and direction at which a motor operates, and wherein an operating potential of only a single polarity need be used with the potentiometer in determining the direction at which the motor operates.

Bidirectional motors admit of various and divers applications. In a typical application thereof, the motor should be capable of operating at a desirable speed and either in a forward or reverse direction. Furthermore, if the motor is controlled by a manually adjustable device, such as a potentiometer, there are certain circumstances wherein the motor should exhibit zero speed when the adjustable element, or potentiometer, is at or very close to a zero speed setting. For example, when the motor is used to drive an article to a particular location, it is advantageous to be able to operate the motor at a relatively high speed until the article approaches the predetermined location, and then to drive the motor at a progressively decreasing speed so as to be able to stop the motor abruptly when the article reaches its predetermined location. In the event of an overshoot, it also is advantageous to drive the motor in a reverse direction so as to return the article to its predetermined location.

One type of motor control system which uses a potentiometer to determine the speed and direction of the motor is described in U.S. Pat. No. 3,950,683, issued to W. P. Lamson. In this system, the potentiometer is provided with both positive and negative operating potentials. The wiper of the potentiometer is adjustable so as to be set either at a zero speed setting, which may correspond to the mid-point of the potentiometer resistance, or at any location between the zero speed setting and either terminal of the potentiometer. Thus, when the wiper is set at a location between the zero speed setting and the potentiometer terminal to which the positive operating potential is supplied, the magnitude of the voltage at the wiper determines the speed at which the motor operates, and the positive polarity of this voltage is used to drive the motor in, for example, the forward direction. Similarly, if the wiper is set at a location between the zero speed setting and the potentiometer terminal at which the operating potential of negative polarity is supplied, then the magnitude of the voltage at the wiper determines the motor speed, and the negative polarity of this voltage is used to drive the motor in, for example, the reverse direction. The motor control system described in this patent also includes a dead-band circuit which prevents undesired slow motor speed, such as motor creeping, when the wiper is set to, or very close to, its zero speed setting.

A significant disadvantage of the motor control system described in the aforementioned patent is the requirement that, in order to control the motor direction, operating potentials of positive and negative polarities must be applied to the potentiometer terminals. By requiring such positive and negative polarity operating potentials, the power supply circuit which is needed to derive these operating potentials is relatively complex.

OBJECTS OF THE INVENTION

Therefore, it is an object of the present invention to provide an improved motor control system which avoids the aforenoted disadvantages of the prior art.

Another object of this invention is to provide a motor control system for controlling the speed and direction at which a motor operates in accordance with the setting of a potentiometer.

A further object of this invention is to provide a motor control system which uses a potentiometer for controlling the speed and direction of a motor, and wherein the potentiometer is supplied with an operating potential of only a single polarity.

An additional object of this invention is to provide a motor control system which uses a potentiometer for controlling the speed and direction of the motor, which potentiometer is supplied with an operating potential of only one polarity, and wherein the setting of the wiper of the potentiometer determines both the speed and direction at which the motor operates.

Various other objects, advantages and features of the present invention will become readily apparent from the following detailed description, and the novel features will be particularly pointed out in the appended claims.

SUMMARY OF THE INVENTION

In accordance with this invention, a motor control system is provided for controlling the speed and direction at which a motor operates. A drive circuit supplies a drive current to the motor, the magnitude of this drive current being determinative of the motor speed. A direction-determining circuit is provided to determine the direction at which the motor operates. In a preferred embodiment, this direction-determining circuit is a steering circuit for steering the drive current to the motor either in a first or in a second current path. A potentiometer comprised of a resistance connected between first and second terminals has a wiper which is adjustably settable along the resistance to determine the desired speed and direction of operation of the motor. A power source has a power terminal and a reference terminal for providing an operating potential across such terminals. The power terminal is coupled to the potentiometer wiper and the reference terminal is coupled to one of the potentiometer terminals. A resistor couples the other potentiometer terminal to the reference terminal. The potentiometer wiper is coupled to the drive circuit and the potentiometer terminal, which is coupled to the reference terminal by the resistor, is coupled to the direction-determining circuit; whereby the setting of the wiper determines the magnitude of the voltage supplied thereby to the drive circuit so as to determine the motor speed, and the setting of the wiper also determines the magnitude of the voltage supplied to the direction-determining circuit from the potentiometer terminal to determine the direction at which the motor operates.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
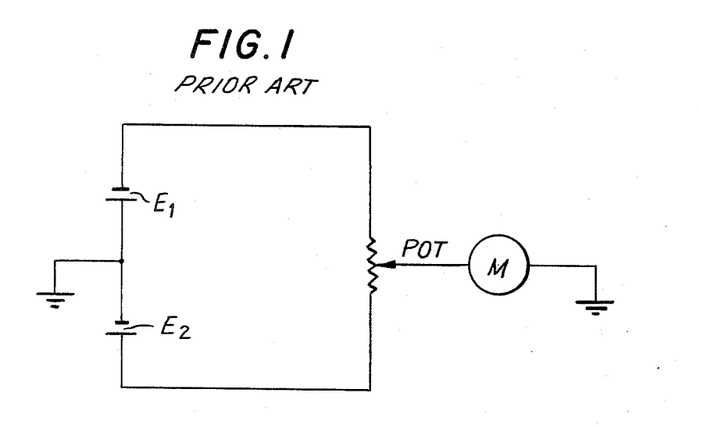
FIG. 1 is a schematic diagram of a prior art technique for controlling the speed and direction at which a motor operates.

Before describing an embodiment of the present invention reference is made to FIG. 1 which is a schematic representation of a prior art technique for using a potentiometer to control the speed and direction of a motor. A negative operating potential, represented as the DC power supply $E_1$, is coupled to one terminal of the potentiometer, and a positive operating potential, represented as the DC power supply $E_2$, is coupled to the other terminal of the potentiometer. The positive and negative operating potentials are referenced to ground, as represented by the ground potential applied to the junction of the positive and negative DC power supplies. The wiper of the potentiometer is coupled to a motor drive circuit which, in turn, drives a motor, the combination of the motor drive circuit and motor being represented at M.

Assuming that the operating potentials are equal ($E_1 = E_2$), then if the wiper of the potentiometer is set at the mid-point of the potentiometer resistance, then a zero voltage is supplied to the motor drive circuit, thereby establishing a zero motor speed. If the wiper of the potentiometer is adjusted in the upward direction, that is, toward the negative DC power supply $E_1$, then a negative voltage is supplied to the motor drive circuit so as to determine a corresponding direction at which the motor operates. Furthermore, depending upon the particular setting of the wiper of the potentiometer, the magnitude of the negative voltage which is supplied to the motor drive circuit determines a corresponding motor speed. Conversely, if the wiper of the potentiometer is adjusted in the downward direction, that is, toward the positive DC power supply $E_2$, then a positive voltage is supplied to the motor drive circuit, thereby determining an opposite direction for the motor. Also, the particular setting of the wiper establishes a corresponding magnitude of this positive voltage so as to correspondingly determine the motor speed.

It is appreciated that, in the prior art technique shown in FIG. 1, two separate power supplies $E_1$ and $E_2$, of opposite polarities, must be provided in order to determine the direction in which the motor is driven. The use of two power supplies $E_1$ and $E_2$ results in a relatively complex construction of the power supply circuitry. It is a principal object of the present invention to provide a motor control system wherein the setting of a potentiometer determines the speed and direction at which a motor operates, yet relies upon only a single power supply, that is, a power supply which provides an operating voltage of only one polarity. Stated otherwise, the motor control system of the present invention achieves substantially the same result as the system shown in FIG. 1, while eliminating either power supply $E_1$ or power supply $E_2$.

Figure 2:
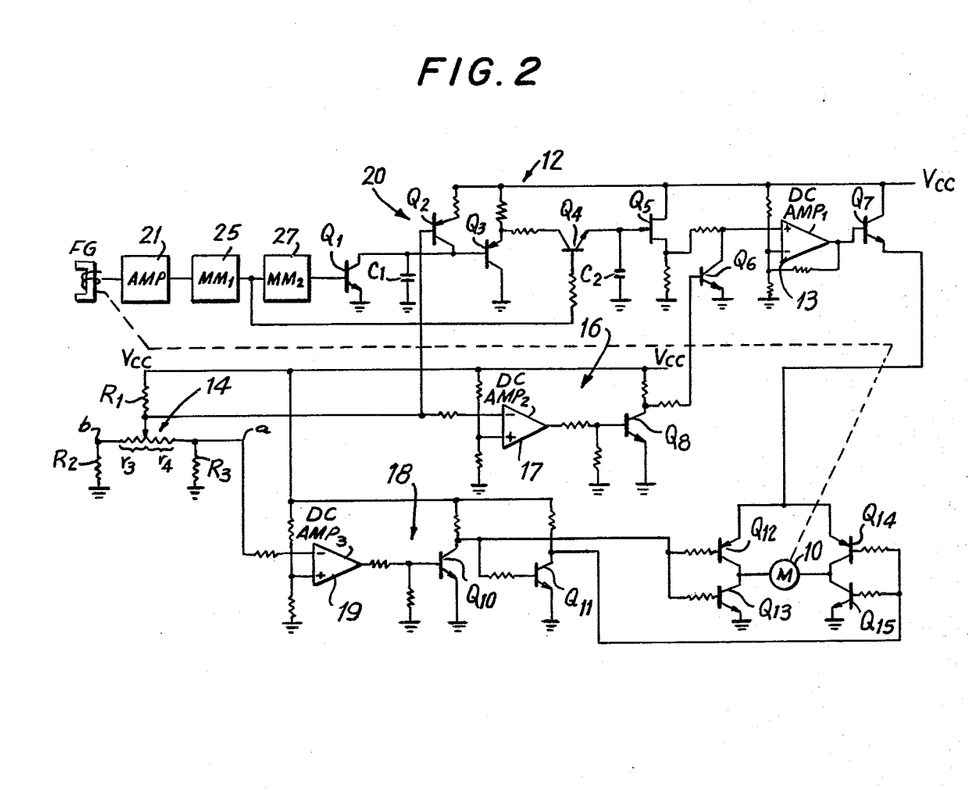
FIG. 2 is a schematic diagram of a preferred embodiment of the present invention.

Turning now to FIG. 2, a preferred embodiment of the motor control system in accordance with the present invention is schematically illustrated. This motor control system is adapted to control the speed and direction of a motor 10 which, for example, is a DC motor. The illustrated DC motor control system includes a speed control circuit 12, a direction control circuit 18, a potentiometer circuit 14 which is used in conjunction with speed control circuit 12 and direction control circuit 18 for determining the speed and direction of operation of motor 10, and a dead-band control circuit 16. Speed control circuit 12 is comprised of a frequency generator FG which is adapted to produce periodic signals, such as pulses, having a frequency determined by the speed at which motor 10 operates. For example, motor 10 may be mechanically coupled to a tachometer device, such as a wheel having one or more magnetic elements mounted thereon. A magnetic pickup is positioned adjacent the wheel so as to produce a pulse whenever a magnetic element rotates therepast. Thus, depending upon the angular velocity of the wheel, and thus the speed of motor 10, a corresponding pulse train is produced by frequency generator FG.

Speed control circuit 12 additionally includes a sawtooth waveform generator 20, monostable multivibrators 25 and 27, a sample-and-hold circuit comprised of a transistor $Q_4$ and a capacitor $C_2$, and a reset circuit including a transistor $Q_1$. Monostable multivibrator 25 is coupled to frequency generator FG by an amplifier 21 so as to produce pulses of a predetermined duration in response to, for example, the positive transition in the pulses which are generated by the frequency generator. The output of monostable multivibrator 25 is coupled to sampling transistor $Q_4$ and, additionally, to monostable multivibrator 27. The latter monostable multivibrator is adapted to generate pulses of predetermined duration in response to, for example, the negative transition in each pulse produced by monostable multivibrator 24. The output of monostable multivibrator 27 is coupled to reset transistor $Q_1$ whose collector-emitter circuit is connected in shunt relation across a capacitor $C_1$, the latter being included in sawtooth waveform generator 20.

The sawtooth waveform generator is comprised of the collector-emitter circuit of a transistor $Q_2$ connected in series with capacitor $C_1$. Depending upon the conductivity of transistor $Q_2$, a current flows from a source of operating potential $+V_{cc}$ through the collector-emitter circuit thereof to charge capacitor $C_1$. Thus, this capacitor charges at a relatively fast rate when transistor $Q_2$ is more conductive; and, conversely, the capacitor is charged at a relatively slow rate when transistor $Q_2$ is less conductive. The voltage across capacitor $C_1$ is coupled through an emitter-follower buffer transistor $Q_3$ to sampling transistor $Q_4$. Storage capacitor $C_2$ is coupled to the emitter electrode of sampling transistor $Q_4$, and this capacitor is further coupled to the gate electrode of a field effect transistor (FET) $Q_5$. It may be appreciated that, because of the high input impedance of FET $Q_5$, capacitor $C_2$ is subject to negligible leakage.

The base electrode of transistor $Q_2$ is coupled to the wiper of a potentiometer $VR_1$ included in potentiometer circuit 14, and is adapted to receive a control voltage therefrom such that its conductivity is determined accordingly. Potentiometer $VR_1$ is of conventional construction and may be formed of typical thin film or integrated circuit techniques, or may be of other conventional construction. The resistance of this potentiometer is provided with a pair of terminals a and b at opposite ends thereof, with terminal b connected to ground by a fixed resistor $R_2$, and with terminal a connected to ground by a fixed resistor $R_3$. The resistance of potentiometer $VR_1$ may be thought of as being constituted by a resistance arm extending between the wiper and terminal b, and having a variable resistance $r_3$, and another resistance arm extending between the wiper and terminal a and having a resistance $r_4$. It is appreciated that the sum of resistances $r_3$ and $r_4$ is constant, but the individual resistance values thereof are dependent upon the positioning or setting of the wiper of the potentiometer. Operating potential $V_{cc}$ is supplied to the wiper via a resistor $R_1$.

In addition to being coupled to the base electrode of transistor $Q_2$, the wiper of potentiometer $VR_1$ also is coupled to the inverting input of an operational amplifier 17 included in dead-band control circuit 16. The non-inverting input of amplifier 17 is coupled to a resistor bias circuit so as to be supplied with a predetermined bias potential. For a purpose soon to be understood, this bias potential is equal to the voltage derived at the wiper of potentiometer $VR_1$ when this wiper is within a predetermined range of its zero speed setting. Amplifier 17 functions as a threshold detector wherein the bias voltage supplied to its non-inverting input constitutes the threshold voltage and the voltage derived at the wiper of potentiometer $VR_1$, and supplied to the inverting input of the amplifier, is compared to this threshold voltage. The output of amplifier 17, which is a function of the difference between the voltage derived at the potentiometer wiper and the threshold voltage, is supplied to a transistor $Q_8$, which functions as an inverting amplifier, and the collector electrode of this transistor is connected to a shunt transistor $Q_6$.

The output electrode of FET $Q_5$, which may be the source electrode thereof, is coupled to the non-inverting input of an amplifier 13 which, for example, may comprise an operational amplifier having a feedback circuit connected to its inverting input and a bias circuit also connected to its inverting input. The collector-emitter circuit of shunting transistor $Q_6$ is connected in series between the non-inverting input of amplifier 13 and ground. The output of amplifier 13 is amplified by a current amplifying transistor $Q_7$ whose collector-emitter circuit is connected between the source of operating potential $V_{cc}$ and motor 10.

Direction control circuit 18 is comprised of an amplifier 19, such as an operational amplifier, having its inverting input coupled to terminal a of potentiometer $VR_1$, and its non-inverting input coupled to a bias circuit for receiving a predetermined bias voltage derived from operating potential $V_{cc}$. Amplifier 19 functions as a threshold detector; and the bias voltage supplied thereto constitutes a threshold voltage. This threshold voltage is equal to the voltage derived at terminal a of potentiometer $VR_1$ when the wiper is set to the zero speed setting of the potentiometer. The voltage provided at terminal a for all settings of potentiometer $VR_1$ is compared to this threshold voltage.

The output of amplifier 19 is coupled to the base electrode of a transistor $Q_{10}$ whose collector electrode is connected to the base electrode of a similar transistor $Q_{11}$. These transistors are adapted to be mutually exclusively conductive. That is, when transistor $Q_{10}$ conducts, transistor $Q_{11}$ is non-conductive. Conversely, when transistor $Q_{11}$ conducts, transistor $Q_{10}$ is non-conductive. The collector electrodes of transistors $Q_{10}$ and $Q_{11}$ are connected to a current steering circuit formed of transistors $Q_{12}$–$Q_{15}$. The current steering circuit functions to selectively establish two current paths from current amplifier transistor $Q_7$ through motor 10. The direction in which the motor operates is directly dependent upon the current path therethrough. As will be explained below, transistors $Q_{12}$–$Q_{15}$ may be switching transistors wherein transistors $Q_{12}$ and $Q_{13}$ are PNP and NPN transistors, respectively, with their collector electrodes connected in common to one terminal of motor 10. Transistors $Q_{14}$ and $Q_{15}$ are PNP and NPN transistors, respectively, with their collector electrodes connected in common to the other terminal of the motor. Transistors $Q_{12}$ and $Q_{15}$ are adapted to be conductive concurrently so as to establish the first current path through motor 10; and transistors $Q_{13}$ and $Q_{14}$ are adapted to be conductive concurrently to establish the other current path through the motor.

Operation of the Speed Control Circuit

Figure 4A:
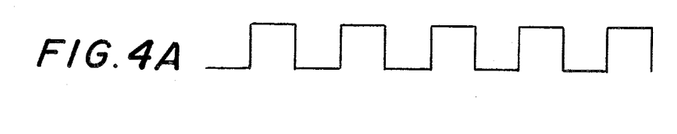
FIGS. 4A–4E and 5A–5E are waveform diagrams which are useful in understanding the operation of the circuit shown in FIG. 2.
Figures 4B, 4C:
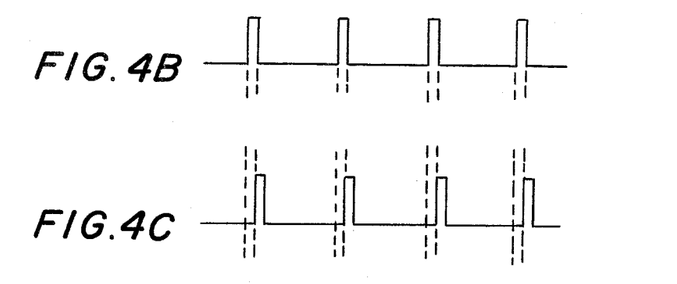

As mentioned above, frequency generator FG is adapted to generated pulse signals, such as the rectangular waveform shown in FIG. 4A, having a frequency determined by the speed of motor 10. Hence, as the motor speed increases, the frequency of the pulses generated by frequency generator FG increases and, conversely, as the speed of motor 10 decreases, the frequency of these pulses likewise decreases. The pulses produced by the frequency generator are amplified by amplifier 21 and used to trigger monostable multivibrator 25. The pulses generated by this monostable multivibrator in response to the positive transition of the pulses generated by the frequency generator are illustrated in FIG. 4B. These pulses produced by the monostable multivibrator turn ON sampling transistor $Q_4$ and, additionally, trigger monostable multivibrator 27 to produce the pulses shown in FIG. 4C. As is apparent, monostable multivibrator 27 is triggered in response to the negative transitions of the pulses produced by monostable multivibrator 25.

Let it be assumed that the wiper of potentiometer $VR_1$ is set at some desired speed setting. It may be appreciated that if the setting of the potentiometer is such that $r_3 + R_2 = r_4 + R_3$, then a maximum voltage is derived at the wiper of the potentiometer. This voltage decreases as the setting of the potentiometer changes. If, for example, $R_2 = R_3$, then the maximum voltage is derived at the wiper of the potentiometer when $r_3 = r_4$, that is, at the mid-point setting of the potentiometer. When the wiper is adjusted from this mid-point setting, the voltage derived thereat is reduced. As will be explained, this setting which results in the maximum wiper voltage, for example, the mid-point setting of potentiometer $VR_1$, is equal to the zero speed setting. It is assumed, for the present discussion, that the potentiometer is set to some desired setting other than this zero speed setting. Accordingly, the voltage suppllied to transistor $Q_2$ by the wiper of potentiometer $VR_1$ is sufficient to establish a desired conductivity of the transistor. The collector-emitter impedance of transistor $Q_2$, taken in conjunction with the capacitance of capacitor $C_1$, establishes a charging time constant, whereby capacitor $C_1$ is charged at a corresponding rate.

Transistor $Q_1$ is rendered conductive periodicially in response to the pulses produced by monostable multivibrator 27 (FIG. 4C). Consequently, capacitor $C_1$ is periodically discharged through the low impedance collector-emitter circuit of transistor $Q_1$. Accordingly, the voltage across capacitor $C_1$ exhibits the sawtooth waveform shown in FIG. 4D. It is appreciated that the slope of this sawtooth waveform is equal to the charging rate of the capacitor and, therefore, is determined by the conductivity of transistor $Q_2$. Since the conductivity of this transistor is a function of the voltage derived at the wiper of potentiometer $VR_1$, it is seen that the slope of the sawtooth waveform (FIG. 4D) is determined by the setting of the potentiometer. Emitter-follower transistor $Q_3$ supplies the sawtooth waveform shown in FIG. 4D to sampling transistor $Q_4$.

Figure 4D:
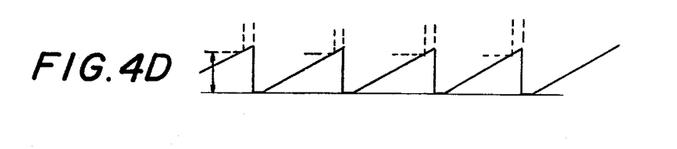
Figure 4E:
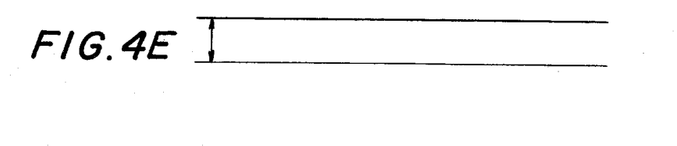

The pulses produced by monostable multivibrator 25 (FIG. 4B) occur just prior to the resetting of the sawtooth waveform (FIG. 4D). Thus, transistor $Q_4$, which is turned ON by the pulses supplied thereto from monostable multivibrator 25 samples the amplitude of the sawtooth waveform, as shown by the horizontal broken lines in FIG. 4D. This sampled amplitude is stored across capacitor $C_2$ and is supplied through FET $Q_5$ to amplifier 13 as the DC level illustrated in FIG. 4E. A corresponding current, determined by the DC level shown in FIG. 4E, is supplied from transistor $Q_7$ to motor 10. Depending upon the desired direction of operation of the motor, this current is supplied either from transistor $Q_7$ via transistor $Q_{12}$, motor 10 and transistor $Q_{15}$ or, alternatively, from transistor $Q_7$ via transistor $Q_{14}$ through motor 10 to transistor $Q_{13}$. Further discussion of the direction-determining current path is set out hereinbelow.

Assuming that the setting of potentiometer $VR_1$ does not change, the speed of motor 10 is controlled so as to be equal to that speed corresponding to the potentiometer setting. Assuming that the speed of motor 10 increases above the desired speed thereof, the frequency of the pulses generated by frequency generator FG (FIG. 4A) correspondingly increases. This increases the frequency of the pulses produced by monostable multivibrators 25 and 27 (FIGS. 4B and 4C, respectively). Thus, since the slope of the sawtooth waveform generated by sawtooth waveform generator 20 remains constant (because the setting of potentiometer $VR_1$ has not changed), it is appreciated that the sawtooth waveform is reset at a time that is earlier in its cycle than shown in FIG. 4D. Consequently, the amplitude of the sawtooth waveform which is sampled by sampling transistor $Q_4$ in response to the pulses produced by monostable multivibrator 25 (FIG. 4B) is less than that shown in FIG. 4D. Therefore, the DC voltage supplied to amplifier 13 is less than that shown in FIG. 4E. Hence, the magnitude of the drive current supplied to motor 10 is reduced. As a result thereof, the speed of motor 10 is reduced to be equal to the level established by the setting of potentiometer $VR_1$.

Conversely, if it is assumed that the motor undergoes an undesired reduction in speed, the frequency of the pulses produced by frequency generator FG, and thus the frequency of the pulses produced by monostable multivibrators 25 and 27, is reduced. This means that, since the slope of the sawtooth waveform remains constant, the sawtooth waveform is reset at a time which occurs much later in its cycle than shown in FIG. 4D. Accordingly, the amplitude of the sawtooth waveform which is sampled by sampling transistor $Q_4$ is greater than the sampled amplitude shown in FIG. 4D. This means that the DC voltage supplied to amplifier 13 is greater than that shown in FIG. 4E. As a consequence thereof, the magnitude of the drive current supplied to motor 10 by transistor $Q_7$ increases so as to correspondingly increase the speed of the motor, whereby the motor speed is restored to its proper, desired level corresponding to the setting of potentiometer $VR_1$.

Figure 5A:
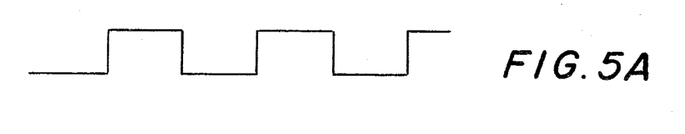
Figures 5B, 5C:
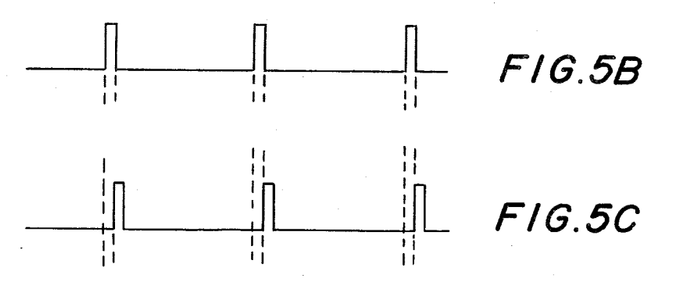
Figure 5D:
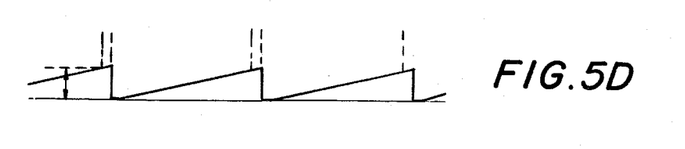

Let it be assumed that potentiometer $VR_1$ is adjusted to a setting corresponding to a slower desired motor speed. This is achieved by adjusting the wiper of the potentiometer in the direction toward the zero speed setting thereof (i.e., the setting wherein $r_3+R_2=r_4+R_3$). It is appreciated that, as the wiper of the potentiometer is moved toward the zero speed setting, the voltage derived thereat increases. An increase in the wiper voltage results in an increase in the base voltage of transistor $Q_2$. Since this transistor is a PNP transistor, its conductivity is reduced, thereby increasing its collector-emitter impedance. This, in turn, increases the charging time constant of capacitor $C_1$, thereby reducing the slope of the sawtooth waveform. This reduced slope is shown in FIG. 5D.

Figure 5E:
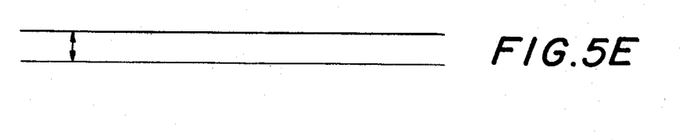

The operation of speed control circuit 12 functions in the same manner as before. Hence, the pulses produced by monostable multivibrator 27 (FIG. 5C) serve to reset the sawtooth waveform; and the pulses produced by monostable multivibrator 25 (FIG. 5B) are used to sample the amplitude of the sawtooth waveform just prior to the resetting thereof. Since the slope of the sawtooth waveform is reduced, it is appreciated that the sampled amplitude thereof likewise is reduced. Consequently, the sampled amplitude, represented by the broken horizontal lines in FIG. 5D, is less than the sampled amplitude shown in FIG. 4D. Accordingly, the DC voltage supplied from capacitor $C_2$ to amplifier 13, as shown in FIG. 5E, is of a lower level than the DC voltage shown in FIG. 4E. Hence, the magnitude of the drive current supplied to motor 10 is reduced, whereby the motor is driven at a slower speed determined by the setting of potentiometer $VR_1$. Of course, any undesired change in the motor speed is detected and corrected in the manner described in detail hereinabove.

Operation of the Dead-band Control Circuit

The purpose of dead-band control circuit 16 is to determine when the setting of potentiometer $VR_1$ is within a predetermined range of the zero speed setting and then inhibit the drive current from being supplied to motor 10. As may be appreciated, in the absence of a dead-band, drive current would be inhibited from motor 10 only when the potentiometer is set precisely to its zero speed setting. It is preferred to provide some tolerance for an operator in setting the potentiometer to a point whereat the motor is stopped.

The bias voltage supplied to the non-inverting input of amplifier 17 is equal to the voltage which is derived at the wiper of potentiometer $VR_1$ when this wiper is set at some predetermined location on either side of the zero speed setting. Since the wiper voltage is a maximum for the zero speed setting, it is appreciated that this bias, or threshold, voltage supplied to the non-inverting input of amplifier 17 is a predetermined voltage which is less than this maximum voltage level. Accordingly, when the setting of potentiometer $VR_1$ is such that motor 10 is operated at some desired speed, it is recognized that the voltage derived at the wiper of the potentiometer for this setting is less than the threshold voltage. Consequently, since the threshold voltage exceeds the voltage which is supplied to the inverting input of amplifier 17 from the wiper of potentiometer $VR_1$, a positive potential is supplied to the base electrode of transistor $Q_8$ by amplifier 17. Hence, transistor $Q_8$ is rendered conductive so as to reduce its collector voltage to a relatively low level. This low level collector voltage is supplied to shunting transistor $Q_6$, thereby rendering this transistor non-conductive. In this condition, the sampled DC level across capacitor $C_2$ is supplied via FET $Q_5$ to amplifier 13. Hence, a drive current is supplied to motor 10 by drive transistor $Q_7$.

As the wiper of potentiometer $VR_1$ is adjusted in a direction toward its zero speed setting, it is recalled that the drive current supplied to motor 10 is reduced so as to correspondingly reduce the motor speed. When the wiper is within the aforementioned predetermined range of its zero speed setting, the voltage supplied therefrom to the inverting input of amplifier 17 exceeds the threshold voltage supplied to the non-inverting input of the amplifier. This is because the voltage now derived at the wiper of the potentiometer is greater than the voltage derived thereat when the wiper is set to the outer limit of its predetermined range, i.e., the threshold voltage. Consequently, a low, or negative, potential is supplied to the base electrode of transistor $Q_8$. This renders transistor $Q_8$ non-conductive, so as to raise the collector voltage thereof to a relatively high level. This high level collector voltage is supplied to shunting transistor $Q_6$, thereby turning this shunting transistor ON. Accordingly, the DC level which is stored across capacitor $C_2$ and which is supplied to amplifier 13 via FET $Q_5$ now is shunted to ground through transistor $Q_6$. Hence, the output of amplifier 13 is of a sufficiently low level so as to turn drive transistor $Q_7$ OFF. This interrupts the drive current supplied to motor 10, thereby stopping the motor. So long as the wiper of potentiometer $VR_1$ is within the aforementioned predetermined range about its zero speed setting, the voltage supplied to the inverting input of amplifier 17 by the potentiometer wiper exceeds the threshold voltage supplied to the non-inverting input of this amplifier. Hence, current is inhibited from being supplied to motor 10 so long as potentiometer $VR_1$ is adjusted to a setting within the aforementioned range, i.e., to a setting within the dead-band range.

Figure 3:
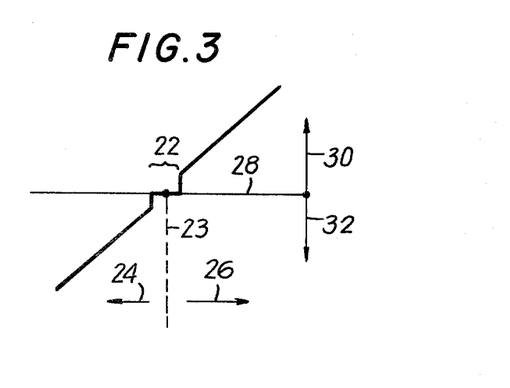
FIG. 3 is a graphical representation showing the manner in which the circuit of FIG. 2 is used to control the operation of a motor.

The manner in which the dead-band range is related to the setting of potentiometer $VR_1$ is diagramatically represented in FIG. 3. Let it be assumed that the abscissa represents the direction in which the wiper of the potentiometer is adjusted, and the ordinate represents the direction in which the motor operates. The dead-band range is shown at 22, with reference numeral 23 identifying the zero speed setting of the potentiometer. That is, at the zero speed setting 23, $r_3+R_2=r_4+R_3$; and the voltage at the wiper of the potentiometer is at a maximum level. If the wiper is moved in the direction 24, for example, the voltage thereat is reduced. However, no current is supplied to motor 10 until the wiper is moved beyond the dead-band range. When the outer limit of this dead-band range is reached, the speed of motor 10 increases abruptly to a level corresponding to the setting of the potentiometer, and in a negative direction. Alternatively, if the wiper is adjusted in the opposite direction, as represented by arrow 26, then motor 10 abruptly starts with a speed corresponding to the setting of the potentiometer, and in a forward direction. It may be appreciated from FIG. 3 that the speed of the motor is the same on either side of the zero setting 23, depending upon the corresponding setting of potentiometer $VR_1$. That is, if the wiper of the potentiometer is adjusted by the same amount to either side of the zero setting, then the speed of the motor will be the same in both the forward and reverse directions. Of course, the direction in which the motor operates depends upon the direction in which the potentiometer is adjusted. Arrows 30 and 32 in FIG. 3 represent forward and reverse motor direction, respectively.

Hence, it is appreciated that if the setting of potentiometer $VR_1$ is within the dead-band range, as represented by the range 22 shown in FIG. 3, then motor 10 remains at rest, regardless of the precise setting of the potentiometer within this range.

Operation of the Direction Control Circuit

It may be appreciated that the combination of resistor $R_1$, resistance $r_4$ and resistor $R_3$ functions as a voltage divider to produce a voltage at terminal a depending upon the particular setting of the wiper of potentiometer $VR_1$. Similarly, resistor $R_1$, resistance $r_3$ and resistor $R_2$ function as a voltage divider. When the wiper of potentiometer $VR_1$ is set to its zero speed setting, then the voltage provided at terminal a is of a predetermined value. For example, if $R_2=R_3$, then the zero speed setting of potentiometer $VR_1$ is the mid-point setting wherein $r_3=r_4$. The bias circuit coupled to the non-inverting input of amplifier 19 supplies a bias voltage thereto which is equal to the voltage at terminal a when potentiometer $VR_1$ is set to the zero speed setting.

If the wiper of the potentiometer is moved toward the right, as viewed in FIG. 2, then resistance $r_4$ decreases. This increases the voltage divider ratio $R_3/(R_1+R_3+r_4)$. Since resistance $r_4$ decreases, the voltage supplied to terminal a increases. That is, this voltage now exceeds the bias voltage supplied to the non-inverting input of amplifier 19. Consequently, the output voltage produced by amplifier 19 renders transistor $Q_{10}$ non-conductive. The collector voltage of this transistor now is sufficiently high to render transistor $Q_{11}$ conductive, whereby the collector voltage of this latter transistor is at a relatively low level. The high collector voltage of transistor $Q_{10}$ turns transistor $Q_{13}$ ON; and the low collector voltage of transistor $Q_{11}$ turns transistor $Q_{14}$ ON. Transistors $Q_{12}$ and $Q_{15}$ now are non-conductive. Thus, drive current is supplied from transistor $Q_7$ to motor 10 via transistors $Q_{14}$ and $Q_{13}$. This current path drives motor 10 in a corresponding direction, for example, in the forward direction. It is appreciated that the magnitude of the drive current is a function of the setting of potentiometer $VR_1$, as described above, so as to correspondingly establish the desired motor speed.

If the wiper of potentiometer $VR_1$ is moved toward the left (as viewed in FIG. 2) from its zero speed setting, resistance $r_4$ increases. Thus, the voltage divider ratio $R_3/(R_1+R_3+r_4)$ decreases so as to reduce the voltage supplied to terminal a. Since this voltage now is less than the voltage thereat which is produced when potentiometer $VR_1$ is at its zero speed setting, it is appreciated that amplifier 19 supplies a voltage to transistor $Q_{10}$ sufficient to render this transistor conductive. Consequently, the collector voltage of this transistor is at a relatively low level, whereby transistor $Q_{11}$ is rendered non-conductive. Thus, the low collector voltage of transistor $Q_{10}$ turns transistor $Q_{12}$ ON; and the high collector voltage of transistor $Q_{11}$ turns transistor $Q_{15}$ ON. Drive current now flows from transistor $Q_7$ to motor 10 through transistors $Q_{12}$ and $Q_{15}$. This current path drives the motor in the opposite direction, for example, in the reverse direction. Of course, the magnitude of the motor speed is determined by the magnitude of the drive current supplied thereto which, in turn, is a function of the setting of potentiometer $VR_1$.

Therefore, it is seen that the adjustment of the wiper of potentiometer $VR_1$ to one or the other side of its zero speed setting is detected by amplifier 19. Depending upon whether the adjustment of this potentiometer is in a direction to determine forward or reverse operation of motor 10, either transistor $Q_{11}$ or transistor $Q_{10}$ is rendered conductive so as to correspondingly control the conductivities of the respective switching transistors included in the current steering circuit.

Thus, it is seen that the direction in which a motor operates is determined in accordance with the setting of a speed control potentiometer without requiring the use of two separate power supplies, or a power supply capable of producing both a positive and a negative operating potential, as was required in the prior art system shown in FIG. 1. Furthermore, the setting of a single potentiometer is used to control both motor speed and direction.

In the embodiment shown in FIG. 2, if it is desired that motor 10 should be capable of operating at the same speeds in both the forward and reverse directions, than $R_2 = R_3$. Alternatively, if it is preferred that motor 10 be capable of operating at higher speeds in one direction than in the other direction, then resistors $R_2$ and $R_3$ should not be equal to each other.

While the present invention has been particularly shown and described with reference to a preferred embodiment thereof, it should be readily apparent to those of ordinary skill in the art that various changes and modifications in form and details can be made without departing from the spirit and scope of the invention. For example, resistors $R_1$, $R_2$ and $R_3$ may be replaced by transistors. Still further, resistors $R_1$, $R_2$ and $R_3$ may be selected such that the slope of the sawtooth waveform generated by sawtooth waveform generator 20 is equal to zero at the zero speed setting of potentiometer $VR_1$. It is, therefore, intended that the appended claims be interpreted as including the foregoing as well as various other modifications and changes.

What is claimed is:

1. A motor control system for controlling the speed and direction at which a motor operates, comprising:
    drive means for supplying a drive current to said motor, the magnitude of said drive current being determinative of the speed at which said motor operates;
    steering means for steering said drive current to said motor in first and second current paths to determine the direction at which said motor operates;
    potentiometer means having first and second terminals, a resistance connected between said first and second terminals, and an adjustable wiper settable along said resistance to determine a desired speed and a desired direction of operation of said motor, the setting of said wiper including a predetermined zero speed setting;
    power supply means having a power terminal and a reference terminal for providing an operating potential thereacross, said power terminal being coupled to said wiper and said reference terminal being coupled to said second terminal of said potentiometer means; and
    first resistor means for coupling said first terminal of said potentiometer means to said reference terminal;
    said wiper being coupled to said drive means and said first terminal being coupled to said steering means, whereby the setting of said wiper determines the magnitude of the voltage supplied thereby to said drive means so as to determine the speed at which said motor operates, and the setting of said wiper also determines the magnitude of the voltage supplied to said steering means by said first terminal to determine the direction at which said motor operates.

2. The motor control system of claim 1 wherein said steering means includes threshold detecting means provided with a threshold voltage substantially equal to the voltage supplied by said first terminal when said wiper is set to said zero speed setting, and threshold detecting means detecting when said voltage supplied by said first terminal exceeds said threshold voltage so as to cause said motor to be driven in a first direction and said threshold detecting means detecting when said voltage supplied by said first terminal is less than said threshold voltage so as to cause said motor to be driven in a second direction.

3. The motor control system of claim 2 wherein said threshold detecting means comprises a bias circuit coupled between said power and reference terminals to produce said threshold voltage; and comparator means having one input coupled to said first terminal and another input coupled to said bias circuit for comparing said voltage supplied by said first terminal to said threshold voltage.

4. The motor control system of claim 3 wherein said steering means further comprises first and second switching circuits for coupling said motor to said drive means, said first switching circuit being energized to establish said first current path when said voltage supplied by said first terminal exceeds said threshold voltage, and said second switching circuit being energized to establish said second current path when said voltage supplied by said first terminal is less than said threshold voltage.

5. The motor control system of claim 1, 2, 3 or 4 further comprising a dead-band circuit coupled to said wiper for inhibiting said drive means from supplying a drive current to said motor when the setting of said wiper is within a predetermined range of said zero speed setting thereof.

6. The motor control system of claim 5 wherein said dead-band circuit comprises second threshold detecting means provided with a second threshold voltage substantially equal to the voltage supplied by said wiper when said wiper is set to the outer limit of said predetermined range, said second threshold detecting means detecting when said voltage supplied by said wiper exceeds said second threshold voltage to inhibit said drive means from supplying said drive current to said motor.

7. The motor control system of claim 6 wherein said dead-band circuit further comprises a shunt circuit coupled to said drive means and operative when said second threshold detecting means detects that said voltage supplied by said wiper exceeds said second threshold voltage to prevent drive current from being supplied to said motor.

8. The motor control system of claim 7 wherein said second threshold detecting means comprises a second bias circuit coupled between said power and reference terminals to produce said second threshold voltage; and second comparator means having one input coupled to said wiper and another input coupled to said second bias circuit for comparing said voltage supplied by said wiper to said second threshold voltage.

9. The motor control system of claim 7 wherein said drive means comprises a drive control circuit for generating a drive control signal as a function of the voltage supplied by said wiper; and a current amplifier coupled to said drive control circuit for producing a motor drive current in accordance with said drive control signal, said shunt circuit being connected between said drive control circuit and said current amplifier for shunting said drive control signal when operative.

10. The motor control system of claim 9 wherein said drive control circuit comprises sawtooth generating means for generating a sawtooth signal, the slope of said sawtooth signal being a function of the voltage supplied by said wiper; pulse generating means for generating periodic pulses of a frequency determined by the speed of said motor; means for using said pulses to reset said sawtooth signal; and means for using said pulses to sample the level of said sawtooth signal, said sampled level constituting said drive control signal.

11. The motor control system of claim 1 further comprising second resistor means for coupling said second terminal of said potentiometer means to said reference terminal.

12. The motor control system of claim 11 further comprising third resistor means for coupling said power terminal to said wiper of said potentiometer means.

* * * * *